United States Patent
Mahr

[11] Patent Number: 5,161,479
[45] Date of Patent: Nov. 10, 1992

[54] LAMINATED SAIL FABRIC

[75] Inventor: Peter Mahr, Weston, Conn.

[73] Assignee: North Sails Group, Inc., Milford, Conn.

[21] Appl. No.: 864,844

[22] Filed: Apr. 7, 1992

[51] Int. Cl.$^5$ .............................................. B63H 9/04
[52] U.S. Cl. .................................... 114/103; 428/105; 428/110; 428/193; 428/257; 428/258; 428/259; 428/294; 428/408; 428/902
[58] Field of Search ............... 428/257, 258, 259, 290, 428/193, 408, 105, 110, 114, 294, 902; 114/103

[56] References Cited
U.S. PATENT DOCUMENTS

| | | | |
|---|---|---|---|
| 4,444,822 | 4/1984 | Doyle et al. | 428/109 |
| 4,590,121 | 5/1986 | Mahr | 428/258 |
| 4,945,848 | 8/1990 | Linville | 114/103 |
| 5,061,553 | 10/1991 | Olsen | 428/412 |
| 5,074,234 | 12/1991 | Stearns | 114/103 |
| 5,097,783 | 3/1992 | Linville | 428/110 |
| 5,097,784 | 3/1992 | Baudet | 114/103 |

Primary Examiner—James J. Bell
Attorney, Agent, or Firm—Juettner Pyle & Lloyd

[57] ABSTRACT

Liquid crystal polymer films are laminated to a textile substrate in a specific fashion to produce a fabric especially useful for sail panels.

9 Claims, No Drawings

LAMINATED SAIL FABRIC

BACKGROUND OF THE INVENTION

Sail fabrics in present use are typically composed of woven fabrics, which are cut into panels of predetermined shape, and the panels are joined together along adjacent edges to make a sail. Laminated sail fabrics are also well known and include one or more films laminated to a woven or nonwoven substrate.

Materials used in sails are chosen on the basis of several properties such as flexibility, strength, stretch resistance, and resistance to tear. The resulting fabric should also have resistance to bias stretch, or stretch at an angle to the warp and fill directions of the fabric. Polyester yarns and films have gained wide acceptance as well as low stretch yarns of aromatic aramids and highly oriented polyethylene.

The use of films composed of liquid crystal polymers in sails is generally disclosed in U.S. Pat. No. 5,061,553, in which such films are used in combination with other films. Liquid crystal films are typically formed by an extrusion process and have a very high strength or stretch resistance in the axial or machine direction, i.e., the direction of extrusion. These films, however, are highly anisotropic and have poor strength and poor tear resistance in the cross machine direction.

SUMMARY OF THE INVENTION

Liquid crystal polymer films are laminated to a textile substrate in a specific fashion to produce a fabric especially useful for sail panels. The substrate comprises an elongate roll of woven or nonwoven textile fabric having a plurality of spaced warp strands extending in the longitudinal or machine direction, i.e., along the length of the fabric. The liquid crystal film, also in roll form, is cut into sections or squares and is rotated ninety degrees or at another angle relative to the fabric. The film is then laminated with an adhesive to the fabric substrate with the machine direction extending across the warp of the fabric. Adjacent film edges may be secured by splices. Thus, the film selectively reinforces the composite fabric in the fill direction and reduces bias stretch. The warp of the fabric provides tear resistance for the film in the weak direction.

The resultant material is then cut into panels of the sail. The panels are cut and arranged such that the warp yarns are generally aligned with known major stress lines in the sail, with the warp yarns carrying the major loads.

DESCRIPTION OF THE PREFERRED EMBODIMENTS

The fabric or textile substrate of the present invention comprises a plurality of spaced warp yarns or strands in woven or nonwoven form. The nonwoven forms may include scrims having a plurality of elongate parallel warp yarns, or a plurality of spaced warp yarns laminated to a film. A particularly suitable woven material or cloth comprises yarns of a relatively high strength in the warp direction, and yarns of a lower strength in the fill direction. For example, aromatic aramid yarns sold under the trademark "Kevlar" may be employed in the warp direction, and polyester yarns may be employed in the fill direction. In the alternative, the warp may comprise highly oriented polyethylene fibers, sold under the trademark "Spectra." Other fibers, such as carbon, may be employed, as well as oriented fibers made of liquid crystal polymers.

The fabric is furnished in roll form with the warp yarns running parallel to the length of the fabric, and the fill yarns, if any, running across the roll. The warp direction is also referred to as the machine direction, or the direction in which the material moves through the weaving machine.

The liquid crystal polymer film is also furnished in roll form and is oriented and has maximum strength in the machine or axial direction. One suitable liquid crystal polymer film and is sold under the trademark "Vectran." These films are formed from thermotropic polymers such as copolyesters, including polyester-polyarylate. Many other liquid crystal films are available and have very high stretch resistance in the machine or axial direction, and much less stretch resistance and tear strength in the cross machine direction.

The liquid crystal polymer film is cut into segments having a length equal to the width of the fabric. The segments are then laminated across the warp of the fabric using an intermediate layer of flexible curable adhesive. As a result, the machine direction of the film extends at right angles to the machine direction of the fabrics. Additionally, a splice, in the form of a strip of film or fabric, may be applied over the seams between the film, or adjacent film edges, using an adhesive.

The combination of warp yarns extending in the load direction and liquid crystal polymer film extending in the cross direction provides several distinct advantages. The warp yarns support the film in the cross or weak direction to prevent tearing or stretching of the film, and even limited stretch of the warp yarns will not cause undue distortion of the film layer. The film layer itself provides much higher strength, stretch and tear resistance in the cross direction in comparison to other types of known films of the same thickness. The combination also results in less bias stretch and allows the sail to more accurately retain the desired or optimum shape over a wider of forces or wind conditions.

The resulting laminate is then cut into panels to make sails or similar pliant articles having lifting surfaces. First, the lines of maximum expected stress in the sail are determined. These stress lines, for example, generally radiate from the corners of a triangular sail and extend along the leech or trailing edge of the sail, and along the foot. The regions and direction of maximum stress on a sail under sailing conditions are well known to those skilled in the are of sail manufacture. The sail panels are cut and arranged such that the warp yarns of the fabric run generally parallel with the lines of maximum stress when the panels are joined together to make the sail. As an example, radial or triangular panels may be used at the corners. As a result, the warp yarns of the fabric carry the major loads in the sail, and the liquid crystal polymer film carries secondary loads in the cross direction.

In addition, it is possible to use more than one layer of film. For example, a layer of film may be bonded to both sides of the fabric. Also, it is possible to cut and apply the film such that the machine direction extends at an angle other than a right angle to the warp of the fabric. For example, one film layer may extend at 45 degrees relative to the warp, and another layer may extend at 135 degrees to the warp. Other angles may be employed, depending on the textile substrate being employed and the overall desired properties. The film is, in all cases, employed to provide strength and stretch resistance across the warp yarns and, in the case of a completed sail, across, or at an angle to, the lines of maximum stress.

As is well known in the art of sailmaking, heavier panels may be used in portions of the sail which receive the most load, with the weight of the panel being defined as the weight per unit area of the fabric. In the case of the present fabric, the denier of the warp and fill yarns can be selected from a wide range. The weight or thickness of the film may be selected as determined by commercial availability and will generally range in the order of 0.25 to 3.0 mils.

Also, it is possible to construct a sail in which some of the panels are made from the laminate of the present invention and other panels are made from other flexible materials such as conventional cloth.

I claim:

1. A laminated sail fabric comprising a textile layer having a plurality of spaced warp strands extending in the longitudinal direction, and a liquid crystal film layer having maximum strength in a given axial direction, said liquid crystal film being laminated to said textile with the axial direction thereof extending across said warp yarns.

2. The laminated sail fabric of claim 1 wherein said textile is a woven material comprising warp yarns and fill yarns and wherein said warp yarns having a higher strength than said fill yarns.

3. The laminated sail fabric of claim 1 wherein said warp yarns are composed of aramid and said fill yarns are composed of polyester.

4. The laminated sail fabric of claim 1 wherein said axial direction of said liquid crystal film extends at right angles to said warp strands.

5. A sail prepared from the laminated sail fabric of claim 1, wherein the sail has lines of maximum stress and comprises a plurality of panels, wherein at least said panels are arranged such that the warp strands are generally in parallel with said lines of maximum stress.

6. The laminated sail fabric of claim 1 wherein said warp strands are composed of a material selected from the group consisting of aramids, highly oriented polyethylene, liquid crystal polymers and carbon.

7. A sail comprising a plurality of panels joined together, said sail when placed in use having lines of maximum stress therein extending in particular directions, at least some of the panels of said sail comprising a laminate comprising a first layer comprising a plurality of spaced warp strands, and a second film layer adhesively bonded to said first layer, said second film layer comprising a liquid crystal polymer having maximum strength in a given axial direction, and the axial direction of said film being disposed at an angle to said warp yarns, at least some of said panels being arranged in the sail with the warp yarns are generally in parallel with said lines of maximum stress.

8. The sail of claim 7 wherein said warp strands are composed of oriented fibers composed of materials comprising aramids, polyethylene, liquid crystal polymers and carbon.

9. The sail of claim 7 wherein said liquid crystal polymer film is a polyester-polyarylate polymer.

* * * * *